Patented Nov. 21, 1950

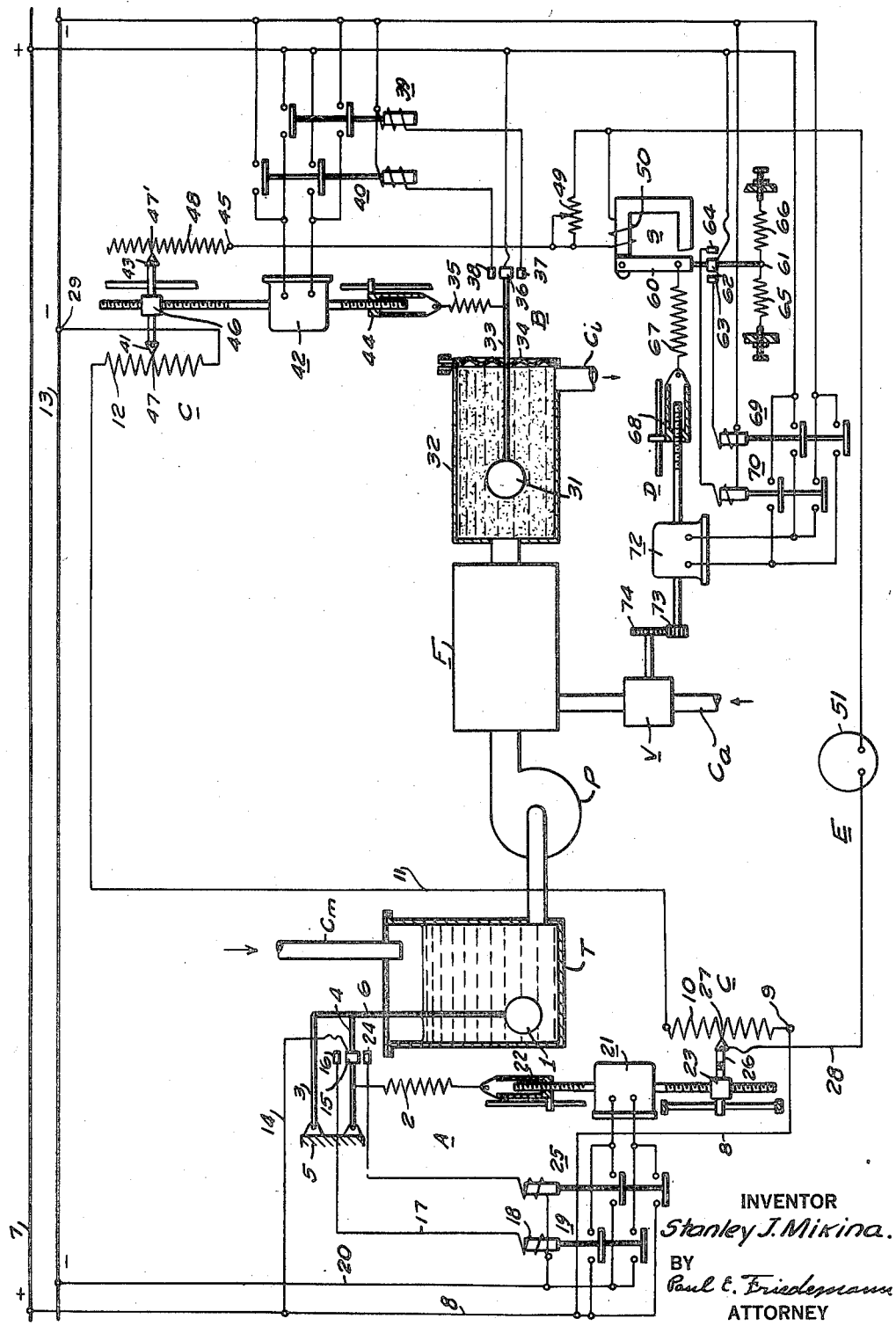

2,530,981

UNITED STATES PATENT OFFICE 2,530,981

CONTROL FOR ICE-CREAM FREEZERS

Stanley J. Mikina, Pittsburgh, Pa., assignor to Westinghouse Electric Corporation, East Pittsburgh, Pa., a corporation of Pennsylvania Application June 2, 1947, Serial No. 751,681

12 Claims. (Cl. 62—2)

My invention relates to apparatus for measuring and indicating a physical characteristic of a material and more particularly relates to an electro-mechanical system for measuring the density of a treated fluid in relation to the density of an untreated fluid.

My invention will be described in its details in combination with a continuous process freezer for freezing ice cream, sherbets, and similar food products, but my invention is not limited to this field of use but has more general use in industry where the density of any fluid treated or having some other fluid of a different density added thereto is measured and indicated in relation to the density of the same fluid that has not been treated or to which no other fluid has been added. The fluid may be a gas or mixture of gases, a combination of a liquid and gas and/or gases, liquids and soluble or suspended solids, etc.

One broad object of my invention is the provision of measuring the density of an untreated fluid, measuring the density of a treated fluid, and comparing the measurements to thus gain information of the sufficiency of the treatment.

Another broad object of my invention is the provision of measuring the difference in density of a liquid before and after being subjected to a processing operation.

A somewhat more specific object of my invention is the continuous measurement of the changes in density of a liquid to which air is added while being subjected to a processing.

Another object of my invention is the provision of means for measuring, indicating, and regulating the mixture of two or more fluids in prescribed proportions.

To more completely comprehend some rather specific objects of my invention hereinafter recited, a brief statement of some specific problems in a particular industry may at this point be in order.

In the freezing of certain food mixtures, more particularly, ice cream, and to some extent sherbets, the amount of air beaten into the mixture has an important bearing on the texture, palatability, hardness, appearance, etc., of the finished product. Not only is the solubility of the finished product increased by the addition of the proper amount of air but the profit also depends on the amount of air beaten into the ice cream, or sherbet, during freezing.

A still further object of my invention is to control the quantity of air introduced into an ice cream mix in a continuous process freezer.

A still other specific object of my invention is to automatically control the air flow to a continuous process freezer, freezing ice cream or similar foods, as a function of the "over-run," a term defined hereinafter.

Other objects and advantages will become more apparent from a study of the following specification and the accompanying drawing, in which the single figure is a schematic showing of my invention as applied to a continuous process freezer.

To better understand my contribution to the art, a few brief statements on the method heretofore in use, and still in use in most ice cream manufacturing establishments, will be helpful.

The amount of air in the ice cream is usually expressed as the volumetric percent of the liquid entering the freezer, and this percentage is termed the amount of "over-run." Thus 100% over-run means the addition of a volume of air, at the ice cream temperature, equal to the original volume of the liquid entering the freezer.

At present, a measure of control is obtained by taking samples of ice cream, preferably at equal intervals of time, and measuring the air content of each sample. This is done by weighing a known volume of ice cream from the freezer spout. The weight of the same volume of the incoming liquid mix is also determined. Knowing the weights of identical volumes of liquid and the finished ice cream, the percent over-run may be computed as follows:

If the weight of a given volume of the entering liquid, or mix, is $W_m$ and the weight of the same volume of ice cream is $W_i$, then the volume of air in the ice cream as a percent of the ice cream volume is, neglecting the weight of the air $$P_o = 100 \frac{W_m - W_i}{W_i}$$

Following such a determination of the percent over-run, $P_o$, the valve on the air line supplying air to the freezer, is then adjusted manually to change the supply of air to the freezer in such a way as to correct the measured inadequacy of the over-run.

This method of intermittent weighing and consequent subsequent intermittent changes in air pressure being supplied to the freezer, is considered quite unsatisfactory by ice cream producers. The method is slow and gives no assurance of correctness of over-run between determinations, nor does it assure a rapid asymptotic approach to the required over-run by the repeated adjustment of the air valve following each over-run determination. Moreover, variations in the temperature of the incoming air and variations in refrigerant flow to the freezer make it impractical to proportion the liquid and air volume by means of positive displacement pumps having the desired ratio of volumetric delivery.

With the apparatus I provide, I obtain automatic control of the air admixture to the freezer in order to maintain a preselected degree of over-run to a high order of accuracy. Measurement of the over-run is accomplished in a continuous manner, a continuous indication and recording of the results are provided. In the figure my invention is shown as applied to existing ice cream freezing equipment. In such equipment the incoming liquid, or mix, to be supplied to a continuous process freezer F, is collected in a mix tank T, whence it is pumped by a suitable pump P, preferably a positive displacement pump, to the freezer F. The flow of the mix from conduit $C_m$ into the tank T is so controlled that the level of the mix in the tank T is at a fixed value. This control is no part of my invention.

Air is supplied to the freezer from a suitable supply evidenced by conduit $C_a$. The air pressure, that is, the air flow to the freezer, is controlled by the valve V. The mix and air are thus thoroughly mixed in the freezer by the action of scrapers and agitators and the combination is at the same time frozen. The frozen ice cream emerges from the freezer in a semi-fluid state in which it is fluid enough to just flow into its final container and level off like a liquid surface.

My over-run regulating equipment includes:

Means A, for continuously weighing a given volume of the liquid mix in the mix tank;

Means B for continuously weighing a given volume of the frozen ice cream continuously being discharged from the freezer;

Means C for automatically combining the measurements made by A and B in such manner as to obtain an electric current proportional to the over-run of the ice cream;

Means D for continuously adjusting the rate of the flow of the air to the freezer F to maintain the desired percent of over-run; and Means E for continuously indicating and/or recording the percent over-run of the freezer discharge.

To measure the weight of a known volume of mix entering the freezer I utilize a balanced float mechanism. In this mechanism the float 1 is completely immersed in the liquid in the tank T. The buoyant characteristics of the float are selected with some regard to the known average density of the mix. Further the buoyant force acting on the float 1 is accurately measured by biasing it to a balanced condition by a spring 2.

The stem of the float projecting above the tank T, is guided for vertical movement by the parallelogram linkage comprising the links 3 and 4 secured to the base 5 and stem 6 as shown. The vertical position of float 1, for any given tension in spring 2, is thus a measure of the density of the mix in the tank T.

To translate the measurements effected by the float 1 into an electric quantity, I utilize a supply of direct current, preferably of constant voltage, evidenced by the buses 7 and 13. To bus 7, I connect a pair of potentiometer resistors 10 and 12, by the circuit including conductor 8, junction 9, potentiometer resistor 10, conductor 11, potentiometer resistor 12 to the junction 29 on the negative bus 13.

Let the assumption be that the density of the mix is greater than represented by the float position shown. The links 3 and 4 are thus moved up and in consequence the movable contact 15 on link 4 engages the stationary contact 16, whereupon a circuit is established from the positive conductor 8 through conductor 14, contacts 15 and 16, conductor 17, actuating coil 18 of the directional contactor 19, and conductor 20 to the negative bus 13. The directional contactor 19 closes its contacts to energize the reversible motor 21, to run in such a direction as to move both the traveling nuts 22 and 23 downwardly.

The traveling nut 22 increases the tension of spring 2 until the movable contact 15 moves out of engagement with the stationary contact. If the change in density of the mix is opposite to that just assumed, then the movable contact 15 engages the stationary contact 24 to thus energize the directional contactor 25 to cause motor 21 to operate in reverse direction so that the traveling nuts 22 and 23 both move up. In either case the motor 21 continues to operate until the force of spring 2 just equals the buoyant force of the float, at which point the control contacts 15 as well as the reversing contactors reach a neutral position and the motor 21 stops. To insure satisfactory accuracy of liquid density determination by this means, the biasing spring 2 is selected to be a comparatively soft and long deflection spring. The spring deflection and the corresponding angular travel of the motor rotor, and thus nut 23, then became quite accurately proportional to the density of the liquid surrounding the float 1.

The travel of nut 23 is directly proportional to the angular rotation of the motor 21. The nut 23 carries the movable contact 26 connected to the flexible lead 28. The position of point 27, representing the changeable contact region of contact 26 on the potentiometer resistor 10, with reference to junction 29 is thus a measure, in terms of voltage, of the density of the mix. The potential drop from point 27 to junction 29 may thus be expressed in terms of $W_m$, the weight of a given volume of mix.

To measure the density of the frozen ice cream, I dispose a float 31 in an enlargement 32 of the discharge pipe of the freezer. The stem 33 of the float is fixed in a flexible diaphragm 34 and the float 31 is so positioned with reference to the flow of the ice cream that the float will be acted upon only by the force of buoyancy. This means for the preferred arrangement the float stem 33 is in a horizontal position and the dynamic forces caused by the ice cream flow are only longitudinally of the stem 33.

The portion of the float stem 33 outside of the enlargement, or float housing 32 is biased by a spring 35. The outer end of stem 33 carries the movable contact 36, disposed to coact selectively with the stationary contacts 37 and 38. If the density increases the movable contact 36 engages the stationary contact 37. Directional contactor 39 is thus actuated to connect the motor 42 to the supply buses 7 and 13. The motor connection is so made that the motor rotates in a direction to move the traveling nuts 44, and 46 upwardly.

The upward movement of the nut 44 increases the tension of the spring 35 until the movable contact 36 is in the neutral position shown. The directional contactor 39 is thus deenergized and the motor 42 stops. When the density of the aerated ice cream decreases contacts 36 and 38 engage to energize contactor 40. The motor 42 now operates to decrease the tension of spring 35. The operation again continues until the elements are in the neutral position shown. In either case, the angular rotation of the motor is a measure of the change in density from a given density.

The revolutions of the spring-biased motor are translated into a proportional voltage by the movement of the traveling nut 46. This nut 46 carries a pair of connected contacts 41 and 43. The contact 41 coacts with the potentiometer resistor 12. Its position on this resistor, with reference to junction 29 is thus a measure of the density of the ice cream. In other words, the potential drop from the point of contact 47 of the contactor 41 to junction 29 is a measure of the weight of a given volume of ice cream. By proper design and selection of the parts having a bearing on the position of contact 41 on the potentiometer resistor 12, the potential from junction 47 to junction 29 may be expressed in terms of $W_i$, the weight of a volume of ice cream equal to the volume expressed by the weight measurement $W_m$, the weight of a corresponding volume of mix. This means that the potential between point 27 and point 47 (or 47′ which is at the same potential) is equal to $$W_m - W_i$$

The circuit from contact point 47′ through rheostat 48, the parallel circuit including the adjustable resistor 49 and actuating coil 50 of the electromagnetic swith S, and the recording ammeter 51 and lead 28 to contact point 27 is thus subject to the voltage represented by the quantity $W_m - W_i$. The recording ammeter measures, indicates and records percent over-run.

For the ammeter 51 to be able to do this, it is necessary to obtain a current in the circuit mentioned in the preceding paragraph that is proportional to the percent over-run.

An electrical current proportional to the amount of over-run is obtained by applying the potential between points 27 and 47′ to the resistor, or rheostat 48. This rheostat 48 has its resistance value changed by the movable contact 43 in such a manner that the resistance drop is proportional to the change of potential from junction 29 to point 47′. The actual resistance value of resistor 48 in relation to resistors 10 and 12 is selected to be considerably larger so as not to draw so much current as to disturb the potential division between points 27 and 47.

The resistance 48, as shown, is in the form of a rheostat operated by the motor 42 which determines the setting, or position, or point 47, which is a measure of the density of the ice cream. In view of the selection of the resistor 48 and the function of contact 43 in relation thereto, the resistance value from junction 45 to point 47′ may be expressed in terms of $W_i$ and the voltage drop may be expressed in terms of the current in the ammeter circuit times the resistance value, that is $P_o W_i = W_m - W_i$. This expression is substantially correct because the resistance values of the ammeter and adjustable resistor 49 and coil 50 are negligible in relation to the resistance value of resistor 48.

From the expression above $$P_o' = \frac{W_m - W_i}{W_i}$$

Since $P_o$ represents the current in the ammeter and is a function of the ratio indicated, it is apparent that $P_o$ may be a reading on ammeter 51 that expresses percent over-run directly. The ammeter 51 may be a standard recording ammeter calibrated to give a continuous record of the percent over-run. The position of the recording pointer will be an indication of the percent over-run of the ice cream, at the time in question, emerging from conduit $C_1$.

To control the percent over-run, the same current traversing the ammeter 51 is passed through a sensitive low impedance magnet coil 50 to produce a force on the armature 60 that is proportional to the percent over-run. The armature 60 has a projecting stem 61 carrying a movable contact 62 coacting with the stationary contacts 63 and 64.

The stem 61 is secured to the two springs 65 and 66, the tensions of which may be adjusted by the tension adjusting means shown. The armature is also connected to a long rather soft tension spring 67, the tension of which is controlled by the position of the traveling nut 68 coupled to be moved axially of the shaft of motor 72.

When the percent over-run deviates from the desired value so that the armature 60 moves out of its neutral position, the position shown, then contact 62 makes contact either with contacts 63 or 64 depending on whether the percent over-run is below or above the desired value.

The contacts 62, 63 and 64 thus directly control the selective energization of the directional contactors 69 and 70, and thus control the direction and duration of rotation of the motor 72 operating, through gears 73 and 74, the air valve V controlling the admission of air to the freezer F.

The effective magnet force, since it is controlled by the spring 67, is altered by the position of nut 68. The motor 72 stops when the biasing force of spring 67 becomes equal to the magnet force. The amount of valve travel is varied by varying the stiffness of spring 67.

The setting of the control to give a certain percent of over-run may be effected either by means of the adjustable resistor 49 shunting the magnet coil 50, or by biasing the magnet armature with a pair of springs, as 65 and 66, and by adjusting the effects of these springs. Either expedient will change the opening of the air valve V until the desired percent over-run current indication on ammeter 51 is obtained.

The accuracy with which the over-run is controlled depends on the stiffness of the spring 67. The lower this stiffness is made, the greater will be the change in the air valve opening for a given change in over-run current in the magnet coil 50 and the more accurately will the desired over-run be maintained.

To obtain more stable regulation of over-run, the rapidity of the actuation of valve V must be properly related to the time delays between the admission of air to the freezer F and the subsequent change in the percent over-run of the ice cream issuing from the freezer. For example, if the freezer capacity is ten gallons and the ice cream flows out at the rate of five gallons per minute, it will take two minutes for a change in air valve opening to appear as the steady state change in over-run in the issuing ice cream. A further delay will occur at the ice cream float 31 by reason of the semi-fluid state of the ice cream. The ice cream is fluid enough to level off when discharged into a container, but is comparatively viscous. The buoyant forces of this semi-fluid mass on the float 31 within the mass will, therefore, manifest themselves fully only when the flow streamlines around the float have reached a steady state configuration. Reaching of the steady state configuration following a change in the over-run will be delayed somewhat by the viscosity of the ice cream. This delay can, however, be kept small by not requiring the float to move appreciably before actuating the control contacts 62, 63 and 64. With a force balance system of measuring such as I use, changes in over-run will manifest themselves fairly quickly as changes in buoyant force on the float.

As a result of the delays mentioned, and principally due to the delay in the transportation of the ice cream from the freezer to the location of the measuring float 31, the correction in the opening of valve V following a change in over-run signal must take place in a time several times longer than the longest time delay in the system if continual oscillations in over-run are to be avoided. Accordingly, the air valve operating motor 72 must be appropriately geared down to the valve to give the desired correction time constant. Once the desired value of over-run is reached, however, it will be automatically maintained for the duration of the process.

While I have shown but one embodiment of my invention, I do not wish to be limited to the single embodiment shown but wish to be limited only by the scope of the claims hereto appended.

I claim as my invention:

1. In apparatus for determining the change in density of a liquid to which a substance is added while the liquid is moved from one point to some other point, in combination, means for continuously measuring the density of a liquid as it passes a given point, means for adding a substance to the liquid, means for continuously measuring the density of the liquid as it passes a given other point and after the substance has been added, means for comparing the measurements made to produce an indication of the change of the density, and control means responsive to said last named means for controlling the operation of the means operable to add the substance to the liquid.

2. In apparatus for controlling a liquid processing operation, in combination, a liquid processing machine, a source of constant potential electric energy, electro-mechanical means coacting with said source and machine for producing an electrical quantity proportional to the density of the liquid, processing modifying means for adding a liquid density changing ingredient to the liquid during the processing, second electro-mechanical means also coacting with said source and machine for producing an electrical quantity proportional to the density of the liquid after the ingredient has been added, electrical means for determining the difference between the electrical quantities produced by said two electro-mechanical means and means responsive to the said electrical means for controlling the operation of the processing modifying means to thus control the amount of the liquid density changing ingredient added to the liquid.

3. In apparatus for controlling a liquid processing operation, in combination, a liquid processing machine, a source of electric energy, electro-mechanical means coacting with said source and machine for producing an electrical quantity proportional to the density of the liquid, processing modifying means for adding a liquid density changing ingredient to the liquid during the processing, second electro-mechanical means also coacting with said source and machine for producing an electrical quantity proportional to the density of the liquid after the ingredient has been added, electrical means for determining the difference between the electrical quantities produced by said two electro-mechanical means, second electrical means for producing an electric quantity proportional to the reciprocal of the electrical quantity produced by the second electro-mechanical means and means responsive to the product of the quantities produced by the first and second electrical means for controlling the operation of the processing modifying means.

4. In apparatus for processing a liquid, in combination, a liquid processing machine, a source of electric energy, electro-mechanical means coacting with said source and said machine for producing an electrical quantity proportional to the density of the liquid, processing modifying means for adding a liquid density changing ingredient to the liquid during the processing, second electro-mechanical means also coacting with said source and said machine for producing an electrical quantity proportional to the density of the liquid after the ingredient has been added, electrical means for determining the difference between the electrical quantities produced by said two electro-mechanical means, second electrical means for producing an electric quantity proportional to the reciprocal of the electrical quantity produced by the second electro-mechanical means and electrical means for indicating the product of said last named electrical quantity and the difference between the electrical quantities produced, respectively, by said two electro-mechanical means.

5. In apparatus for controlling a liquid processing operation, in combination, a liquid processing machine, a source of electric energy, electro-mechanical means coacting with said machine and source for producing an electrical quantity proportional to the density of the liquid, means for adding a liquid density changing ingredient to the liquid during the processing, second electro-mechanical means also coacting with said machine and source for producing an electrical quantity proportional to the density of the liquid after the ingredient has been added, electrical means for determining the difference between the electrical quantities produced by said two electro-mechanical means, electrical means for producing an electric quantity proportional to the reciprocal of the electrical quantity produced by the second electro-mechanical means, electrical means for indicating the product of said last named electrical quantity and the difference between the electrical quantities produced, respectively, by said two electro-mechanical means and means responsive to the said product of the mentioned electrical quantities for controlling the rate of addition of the ingredient that changes the density of the liquid.

6. In combination with apparatus for freezing ice cream, sherbets, or similar food products and where the freezing operation includes the addition of air to the food product to change its texture and palatability, means for controlling the rate at which air is admitted to the apparatus, measuring means for measuring the amount of air the finished product in relation to the unfrozen mix, and means responsive to said measuring for controlling said means for controlling the rate at which air is admitted to the apparatus whereby the amount of air in the finished product may be controlled.

7. In a continuous process freezer for freezing ice cream, sherbets, or similar food products, in combination, means for continuously weighing a given volume of the mix before it enters the freezer, means for continuously weighing a like volume of the frozen product after it emerges from the freezer, electric circuit means energized from a suitable source of energy and acted upon by said two continuously operating weighing means to produce an electric quantity indicative of the change in density of the finished product with reference to the mix.

8. In a continuous process freezer for freezing ice cream, sherbets, or similar food products, in combination, means for continuously weighing a given volume of the mix before it enters the freezer, means for continuously weighing a like volume of the frozen product after it emerges from the freezer, electric circuit means energized from a suitable source of energy and acted upon by said two continuously operating weighing means to produce an electric quantity indicative of the change in density of the finished product with reference to the mix, means for supplying air to the freezer to change the density of the finished product with reference to the mix, and means responsive to the electric quantity indicative of the change in density for altering the rate at which air is supplied to the freezer.

9. Apparatus for controlling the process of manufacture of a product mixture comprising, in combination, means for producing a first electrical quantity in dependence of the weight of a given volume of said product in one physical state, means for varying the physical state of said product, means for producing a second electrical quantity in dependence of the weight of the same given volume of said product in its varied physical state, means for differentially comparing said electrical quantities, and means responsive to the ratio of the differential of said quantities to said second quantity for controlling said means for varying the physical state of said product.

10. In apparatus for indicating a change in a physical characteristic of a product mixture produced by a manufacturing process to which the liquid product mixture is subjected, in combination, means for producing a first electrical quantity in dependence of the average density of said product mixture in one physical state, as for example a liquid state, means for semi-solidifying, as for example by cooling said product mixture, means for producing a second electrical quantity in dependence of the average density of said semi-solidified product mixture, and means for indicating the ratio of the differential of said first and second quantities and said second quantity.

11. Apparatus for controlling the process of manufacture of ice cream, comprising, in combination, a source of electric energy, a freezer, means moving ice cream mix through the freezer, means coacting with said source of electric energy and the means for moving ice cream mix through the freezer for producing a first electrical quantity proportional to the weight of a given volume of ice cream mix, means for adding air to the ice cream during the freezing process, means coacting with said source of electric energy and the means for moving ice cream mix through the freezer for producing a second electrical quantity proportional to the weight of the same given volume of the finished ice cream, means for differentially comparing said two electrical quantities, and means for indicating the ratio of the differential of said quantities and the second quantity to thus indicate the amount of air added during the freezing operation.

12. Apparatus for controlling the process of manufacture of ice cream, comprising, in combination, a source of electric energy, a freezer, ice cream mix transmitting means, means coacting with said source of electric energy and the means for moving ice cream mix through the freezer for producing a first electrical quantity proportional to the weight of a given volume of ice cream mix, means for adding air to the ice cream during the freezing process, means coacting with said source of electric energy and the means for moving ice cream mix through the freezer for producing a second electrical quantity proportional to the weight of the same given volume of the finished ice cream, means for differentially comparing said two electrical quantities, electric current measuring means for indicating the ratio of the differential of said quantity and the second quantity and the second quantity to thus indicate the amount of air added during the freezing operation, and means responsive to the electric current in said measuring means for controlling the amount of air in the ice cream.

STANLEY J. MIKINA.

REFERENCES CITED

The following references are of record in the file of this patent:

UNITED STATES PATENTS

| Number | Name | Date |
|---|---|---|
| 1,940,473 | Vogt | Dec. 19, 1933 |
| 1,951,365 | Morrow | Mar. 20, 1934 |
| 2,131,511 | Gray | Sept. 27, 1938 |